United States Patent [19]

Ryan et al.

[11] 4,128,208

[45] Dec. 5, 1978

[54] EXHAUST NOZZLE FLAP SEAL ARRANGEMENT

[75] Inventors: Edward W. Ryan, Mason; George H. Israel, Jr., Cincinnati, both of Ohio

[73] Assignee: General Electric Company, Cincinnati, Ohio

[21] Appl. No.: 814,567

[22] Filed: Jul. 11, 1977

[51] Int. Cl.² .............................................. B64C 15/08
[52] U.S. Cl. .................................. 239/265.39; 60/271
[58] Field of Search ....................... 239/265.39, 265.41; 60/271, 226 A

[56] References Cited

U.S. PATENT DOCUMENTS

| 2,910,828 | 11/1959 | Meyer et al. ............................. 60/271 |
| 3,612,400 | 10/1971 | Johnson et al. ................... 239/265.41 |
| 3,730,436 | 5/1973 | Madden et al. ................. 239/265.39 |
| 3,794,244 | 2/1974 | McMath ........................... 239/265.41 |

Primary Examiner—Evon C. Blunk
Assistant Examiner—Michael J. Forman
Attorney, Agent, or Firm—Dana F. Bigelow; Derek P. Lawrence

[57] ABSTRACT

A variable area exhaust nozzle is provided with seals between adjacent flaps to minimize flow loss therebetween when the flaps are modulated between minimum and maximum nozzle area positions. The overlapping seals is linked to the adjacent flaps by means of a bellcrank which operates to maintain the seal in a centered position between the flaps. A circumferential track is provided on the flaps to stabilize the seal in the axial direction.

9 Claims, 5 Drawing Figures

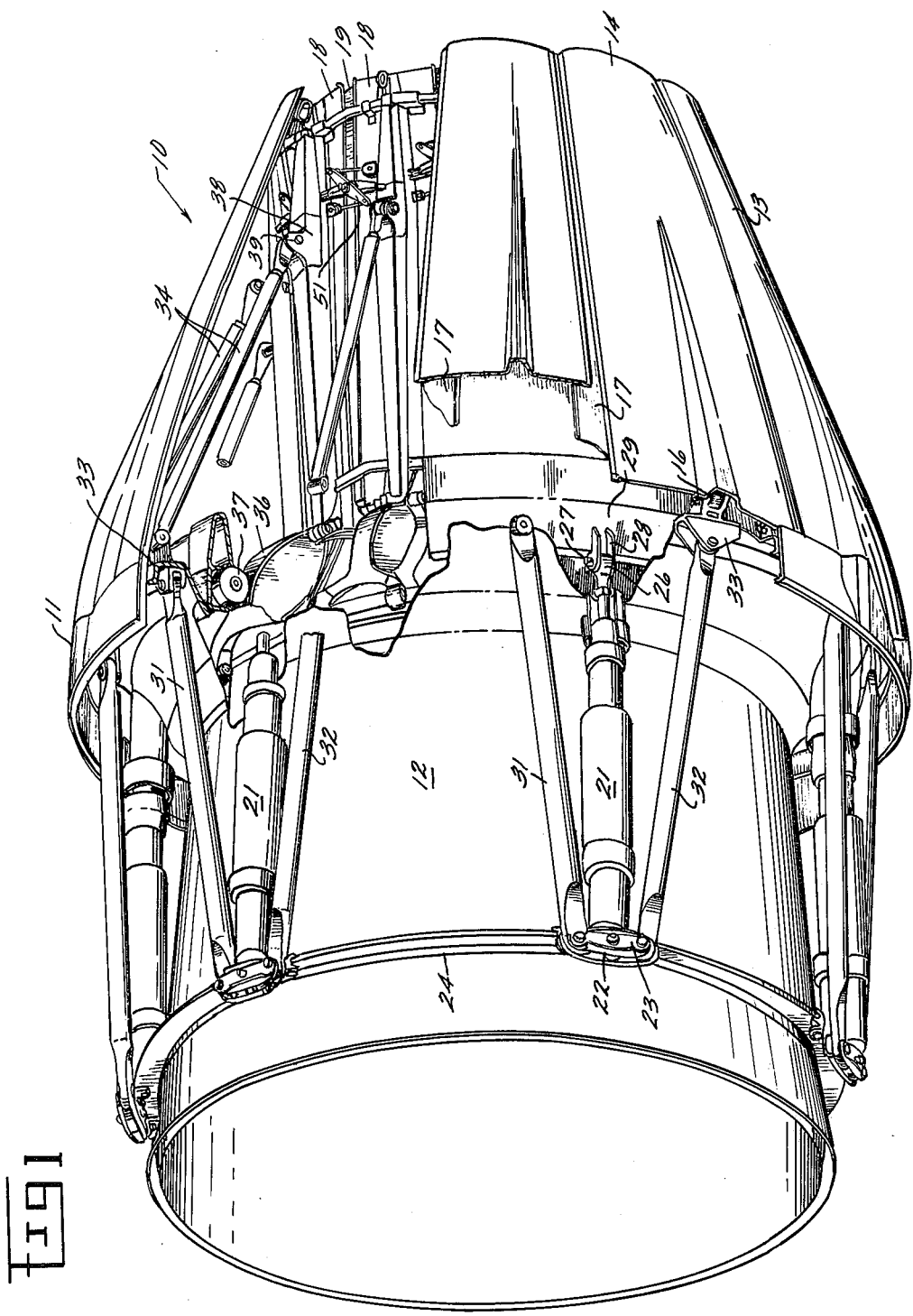

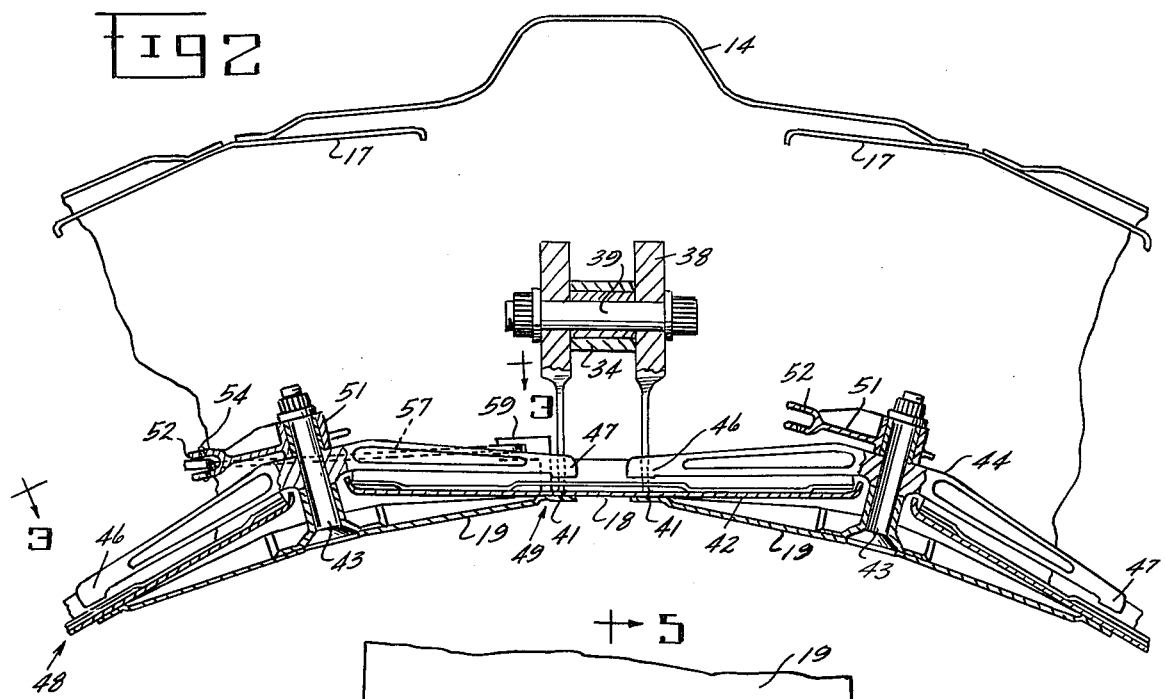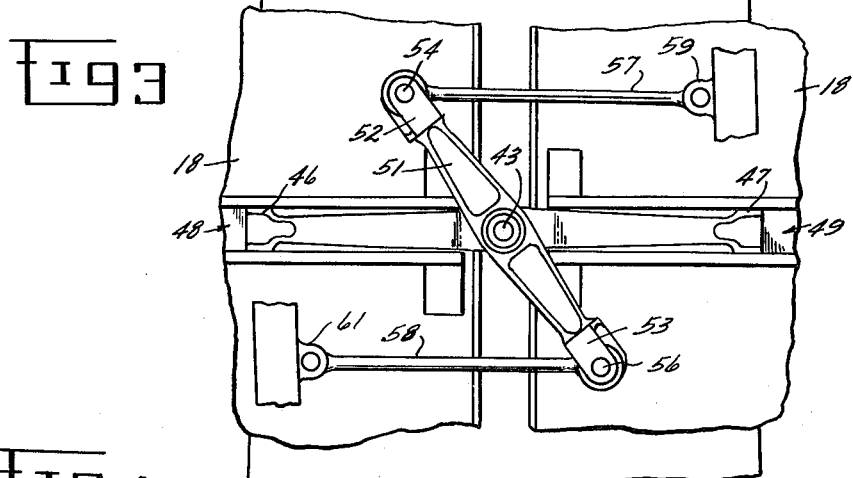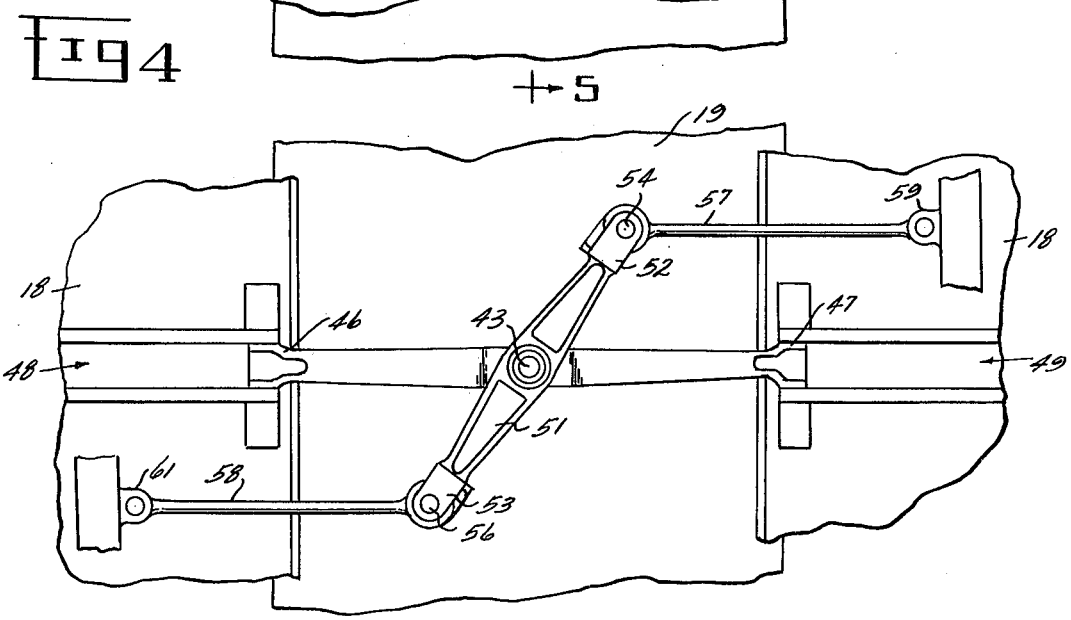

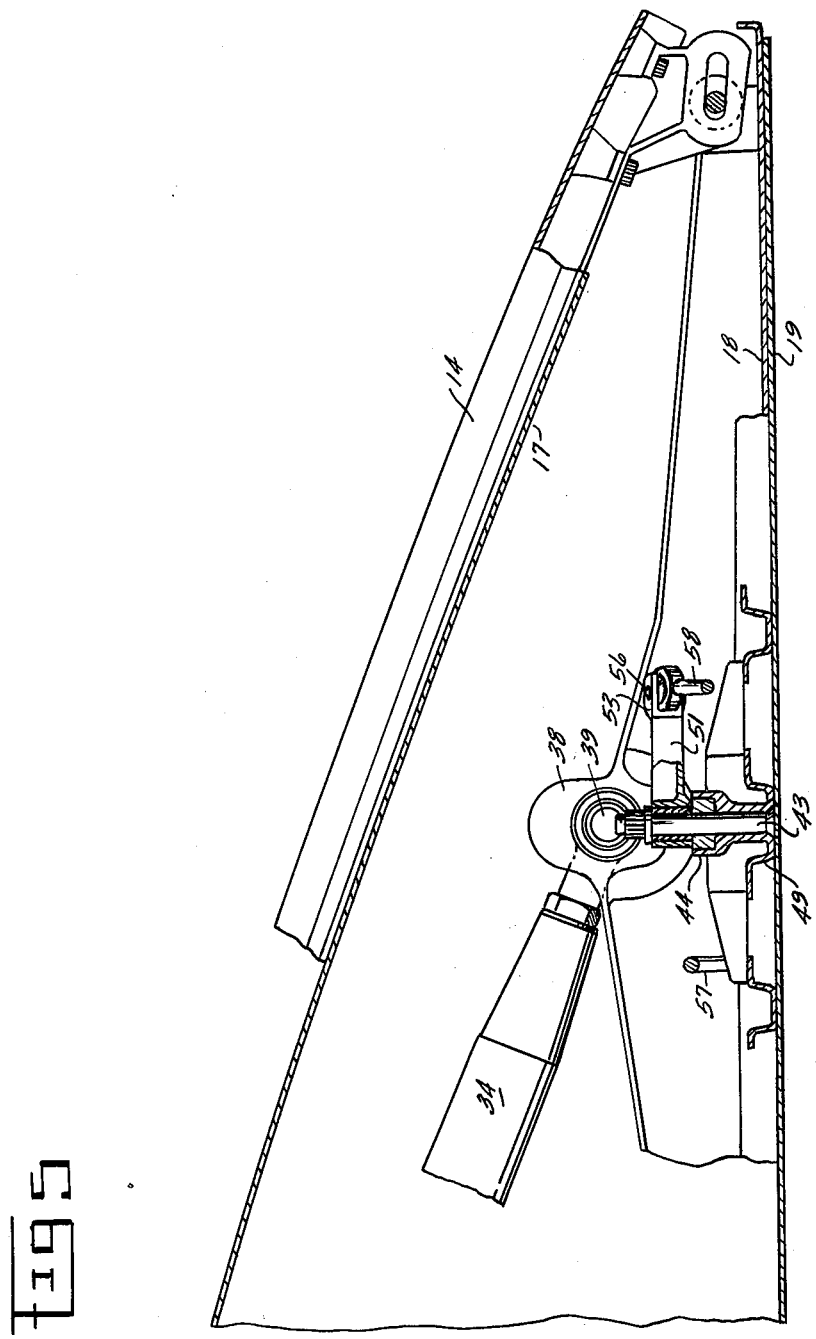

EXHAUST NOZZLE FLAP SEAL ARRANGEMENT

BACKGROUND OF THE INVENTION

This invention relates to variable area exhaust nozzles for gas turbine engines and, more particularly, to sealing means for nozzle flaps of turbojet engines.

The exhaust nozzle of a gas turbine engine, such as a turbojet or turbofan engine, has as its purpose a transformation of the pressure and thermal energy of the combustion discharge into velocity, with the forward thrust of the engine being directly proportional to the increase in velocity of the gas from the entrance of the engine to the exit plane of the nozzle. In high performance engines and, in particular, in engines having some sort of thrust augmentation such as an afterburner, it has been found desirable to cause a variation of nozzle flow area to maintain high engine performance under a wide range of operating conditions. For example, it is desirable to provide a larger nozzle flow area during a take-off mode of operation than during a cruise mode. In addition to the function of maintaining the exhaust gas temperature within allowable limits, variable area exhaust nozzles may be employed to bring about noise, thrust and fuel economy benefits. One means for varying the nozzle flow area is by the so-called iris mechanism wherein a plurality of concentrically disposed movable members or flaps are pivotably supported about the nozzle axis. One of the problems associated with such an arrangement is the need to maintain effective sealing between the flaps as the flaps are adjusted to vary the nozzle flow area. Therefore, it is desirable to provide an exhaust nozzle whose area can be flexibly varied between minimum and maximum positions while maintaining a circumferentially continuous aerodynamic structure throughout the entire range.

Early method of locating seals with respect to exhaust nozzle flaps relied entirely on a combination of bolts and spectacles wherein, when the nozzle was in the closed position the seals were relatively free to move in the circumferential direction, and when the flaps moved toward the open position, the position of the seals was still not positively enough controlled so as to maintain circumferential sealing integrity around the entire nozzle periphery. Some of the problems encountered were those of dimensional stack-up, limited seal overlap within the circumferential envelope, and misalignment due to nozzle sag on or near the horizontal plane. These problems caused nozzle leakage and seal "blow-out", thereby resulting in decreased nozzle efficiency.

Recent methods of effecting positive placement of seals within exhaust nozzles employ a combination of linkage pairs interconnecting the flaps to the seal wherein an axial track is located on the seal for the purpose of varying the effective lengths of the links. Such an arrangement has been recognized as being somewhat complex and requiring an excess number of moving parts which are susceptible to wear and malfunction.

Accordingly, a primary object of the present invention is to provide an improved seal arrangement for a jet engine variable exhaust nozzle flap.

Another object of this invention is the provision in a variable exhaust nozzle for the maintaining of circumferential sealing integrity throughout the range of nozzle areas.

Yet another object of the present invention is the provision for maintaining a variable area exhaust nozzle seal in a centered relationship between adjacent flaps during all modes of nozzle operation.

These objects and other features and advantages become more readily apparent upon reference to the following description when taken in conjunction with the appended drawings.

SUMMARY OF THE INVENTION

Briefly, in accordance with one aspect of the invention, the individual seal members which are located in overlapping relationship between each adjacent pair of flaps, are mechanically connected to the flaps by way of a three-bar linkage, or bellcrank, combination. The end bars which are attached to opposite ends of the center bar, provide positive connection to the respective flaps while the center bar is rotatable to accommodate the variable effective lengths of the end bars as the flaps are modulated throughout the operating range. In this way the axial track and associated moving parts are eliminated.

By another aspect of the invention, a circumferential track is provided on the respective flaps to receive a mating projection from the interposed seal in such a manner as to stabilize the axial position of the seal over the entire range of nozzle flap movement.

By yet another aspect of the invention, the clevises of adjacent flaps, which are mechanically connected to the respective end bars, are axially misaligned in such a manner as to reduce the axial loads on the center pin which connects the center bar to the seal member. Further, the respective lengths of the two end bars are different to the extent necessary to enable balanced mechanical operation in view of the fact that one is located axially forward of the other and is therefore exposed to a smaller arc of movement for a given variable exhaust area.

In the drawings as hereinafter described, the preferred embodiment is depicted; however, various other modifications and alternative constructions can be made thereto without departing from the true spirit and scope of the invention.

BRIEF DESCRIPTION OF THE DRAWINGS

FIG. 1 is a perspective view of a jet engine exhaust nozzle with a preferred embodiment of the present invention incorporated therein.

FIG. 2 is a fragmentary rear view of the exhaust nozzle showing the bellcrank portion thereof in accordance with a preferred embodiment of the invention.

FIG. 3 is a fragmentary top view of the bellcrank portion thereof in a position which represents a closed-nozzle position.

FIG. 4 is a top view thereof showing the bellcrank in an open nozzle position.

FIG. 5 is a fragmented longitudinal section view of the nozzle with the preferred embodiment of the present invention incorporated therein.

DESCRIPTION OF THE PREFERRED EMBODIMENT

Referring now to FIG. 1, the present invention is shown generally at 10 as being incorporated into an iris-type jet engine exhaust nozzle 11 comprising in serial flow relationship a fixed area duct 12 and a variable area downstream section 13. Although the nozzle as shown is of the convergent-divergent type wherein the downstream section 13 includes both a convergent and a divergent section as will be discussed hereinafter, the present invention is not intended to be limited to such a structure.

The variable area section 13 includes at its outer periphery a plurality of circumferentially spaced, outer flaps 14 having their forward end 16 hinged on a common circle in such a way as to collectively define a continuous downstream converging frustum of a cone when the nozzle is in the closed position, and forming a discontinuous frustum of a cone when in the open position, the discontinuity being pie-shaped in form. In order to offset the aerodynamic effect of these discontinuities, a plurality of outer seals 17 are placed in close relationship with the inner sides of the flaps, with an outer seal being placed between each pair of outer flaps so as to effectively seal off the discontinuities whenever the nozzle is not in the fully closed position. Together the nozzle outer flaps 14 and the outer seal 17 define the outer flow path of the variable area section 13 of the nozzle.

Referring now to the inner flow path of the variable area section 13 of the nozzle, a plurality of circumferentially spaced, internal convergent flaps (not shown) comprise the upstream convergent section and a plurality of circumferentially spaced divergent flaps, immediately downstream, comprise the divergent section. When the divergent flaps are in the closed position, they define a circumferentially continuous inner flow annulus and when opened by rotation of the individual flaps about their axes located on a common circle at their forward ends, they tend to create pie-shaped discontinuities which are sealed by a plurality of inner seals 19 which are disposed in close-sealing relationship with the inner surface of the divergent flaps 18. It will be recognized that as the divergent flaps 18 are opened, in order to maintain an optimum sealing relationship with the inner seals 19, it is necessary to maintain the position of the seals in a centered relationship with respect to the adjacent flaps 18. For this purpose, the bellcrank arrangement shown generally at 10 is incorporated and will be more fully discussed hereinafter. It should be noted that in order to maintain the inner seal in alignment it will be necessary to have a pair of axially spaced centering devices, at least one of which comprises the present bellcrank arrangement; however, for purposes of description only a single such device is shown in FIG. 1.

Variations in the nozzle area are generally controlled by either a crew command or automatically in accordance with engine performance requirements and are generally accomplished by hydraulic means. The plurality of hydraulic actuators 21 are disposed around the duct portion 12 of the nozzle with their one end 22 connected by a mounting plate 23 to a ring 24 which tends to fix the radial position of the actuators. The other end 26 of the actuator 21 is connected by a bolt 27 to a clevis 28 which extends from a fixed diameter actuation ring 29. Similarly, a pair of support links 31 and 32 located one on either side of the actuator 21 rigidly attach the mounting plate 23 to a stationary collar 33, their purpose being to transfer the axial forces of the actuator back to a stable portion of the structure. Also connected to the stationary collar 33 by way of the secondary drive links 34 are each of the divergent flaps 18.

Briefly, variation in the area of the nozzle is accomplished as follows. When it is desired to open the nozzle from its fully closed position, hydraulic fluid is supplied to the actuators so as to extend their length and move the actuation ring 29 axially rearward. Simultaneously, the cammed surface 36, which forms a part of the convergent flap (not shown), and which engages a roller 37 on the actuation ring 29, is allowed to move radially outward with rearward movement of the actuation ring 29. In this way, the area of the variable area section portion of the nozzle (including both the convergent and divergent sections) is increased. To close the nozzle, the process is reversed.

Referring to that portion of the nozzle as shown in FIGS. 2 and 5, the divergent flap 18 is connected to the secondary drive link 34 by way of a bracket 38 and included bolt 39. The inner seals 19 are located radially inward from the divergent flap 18, one on either side of the flap, with each having a beveled portion 41 which fits flatly against and closely engages the inner side 42 of the divergent flap 18. Disposed in each of the inner seals 19, at the circumferential center thereof, is a post 43 extending radially outward for receiving the apparatus which interconnects with the adjacent flaps. An elongate, angled follower 44 fits over the post 43 and extends outwardly on either side thereof to engage with its opposite ends 46 and 47, the respective circumferential tracks 48 and 49 formed in the outer sides of the adjacent inner flaps. The follower 44 and associated tracks function to maintain the axial position of the inner seal 19 relative to the inner flaps as will be described more fully hereinafter.

Also mounted to each of the posts 43 is an elongate center bar 51 which is rotatably mounted on or near its center. On the opposite ends of the center bar 51 are clevises 52 and 53 for receiving pins 54 and 56, respectively. Connection to the adjacent inner flaps is then effected by end links 57 and 58 and associated clevises 59 and 61.

Operation of the bellcrank apparatus comprising the center bar 51 and end bars 57 and 58 can be seen in FIGS. 3 and 4. In FIG. 3 the flaps 18 are in the closed position and the inner seal 19 is centered therebetween and overlaps to the maximum extent on either side. The bellcrank is in the retracted position and rigidly holds the inner seal 19 transversely with respect to the flaps, and the follower and track combination fixes the axial position of the inner seal with respect to the flaps. As the flaps are opened by operation of the actuators 21 in the manner discussed hereinabove, the center bar 51 begins to rotate in the clockwise direction to extend the bellcrank arrangement to the fully opened position as shown in FIG. 4. At the same time the follower ends 46 and 47 are allowed to slide within the tracks 48 and 49 to allow the flaps to separate while at the same time fixing the axial position of the inner seal with respect to the flaps. It will be seen by reference to FIGS. 3 and 4 that the centerbar 51 is attached substantially at its centerpoint and that the end links 57 and 58 are of substantially equal length and aligned in parallel relationship at all times. Considering the differences between the arcs of movement of the forward link 57 and that of the aft link 58 when the flaps and seals are rotated about a forward axis, it has been found desirable to shorten or lengthen the links appropriately in order to accommodate these differences and balance the loads. For example, for these reasons it is desirable to have the forward portion (that connected to link 57) of the center bar slightly shorter than the aft section thereof. Similarly, it is also desirable to have the link 57 slightly shorter than the link 58 for the same reason.

Further, it can be seen from FIG. 2 that the connection of the end link 57 to the clevis 52 is not squarely in line and, in fact, the axis of the end link 57 will move as the flaps are opened. For this reason it is desirable to have a three-dimensionally flexible connection such as a uniball or the like between the end link and the center bar.

It will be understood that while the present invention has been described in terms of a preferred embodiment, it may take on any number of other forms while remaining within the scope and intent of the invention.

Having thus described what is considered novel and claimed and desired to be secured by Letters Patent of the United States is:

1. An improved linkage means for an aircraft engine variable exhaust nozzle of the type having a plurality of circumferentially spaced flaps with seals interposed therebetween and overlapping adjacent pairs, wherein the improvement comprises:
    (a) an elongate center bar pivotably connected proximate its center to the proximate circumferential center of the seal; and
    (b) a pair of end bars, each one pivotably connected at its opposite ends to one end of its center bar and to one of the flaps such that an opening of the flap causes a rotation of said center bar and said pair of end bars to maintain the seal in centered relationship between the adjacent flaps.

2. An improved linkage means as set forth in claim 1 wherein said end bars are of substantially equal length.

3. An improved linkage means as set forth in claim 1 wherein said flap connected ends of said pair of end bars are axially displaced from each other.

4. An improved linkage means as set forth in claim 1 and including means for preventing axial movement of the seal with respect to the flaps.

5. An improved linkage means as set forth in claim 4 wherein said preventing means comprises a track means on the flaps and an associated follower means on the seal.

6. An improved linkage means as set forth in claim 1 wherein the disposition of the center bar is such that when the flaps are in the open position, the center bar forms an acute angle with the axis of the nozzle.

7. An improved linkage means as set forth in claim 1 wherein the disposition of said center bar is such that when the nozzle is fully closed, the center bar forms an acute angle with the axis of the nozzle.

8. An improved linkage means as set forth in claim 1 wherein the seals are located radially inward of the flaps.

9. An improved linkage means as set forth in claim 1 wherein said end bars and said center bar are located radially outside of the seal.

* * * * *